(12) United States Patent
Guettinger et al.

(10) Patent No.: US 7,378,770 B2
(45) Date of Patent: May 27, 2008

(54) ELECTRICAL MACHINE COMPRISING BRUSH HOLDER THAT CAN BE SIMPLY POSITIONED AND MOUNTING METHOD FOR ELECTRIC MACHINE

(75) Inventors: Joachim Guettinger, Achern (DE); Orlando Gabriel De Dias, Karlsruhe (DE); Guillaume Delelee-Prehaut, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/532,491

(22) PCT Filed: Jun. 2, 2004

(86) PCT No.: PCT/DE2004/001127

§ 371 (c)(1),
(2), (4) Date: Apr. 25, 2005

(87) PCT Pub. No.: WO2005/027316

PCT Pub. Date: Mar. 24, 2005

(65) Prior Publication Data

US 2006/0033390 A1    Feb. 16, 2006

(30) Foreign Application Priority Data

Sep. 5, 2003    (DE)    ............................ 103 40 940

(51) Int. Cl.
*H02K 5/00*    (2006.01)
(52) U.S. Cl. ...................................................... 310/89
(58) Field of Classification Search ........ 310/241–248, 310/89
See application file for complete search history.

(56) References Cited

U.S. PATENT DOCUMENTS

| | | | | |
|---|---|---|---|---|
| 672,604 | A * | 4/1901 | Lundell | 310/239 |
| 2,194,211 | A * | 3/1940 | Sansom | 318/254 |
| 3,094,594 | A * | 6/1963 | Watson | 200/408 |
| 3,339,048 | A * | 8/1967 | Haderer | 200/268 |
| 3,450,915 | A * | 6/1969 | Zumsteg | 310/239 |
| 3,466,481 | A * | 9/1969 | Sckerl | 310/239 |
| 4,381,468 | A * | 4/1983 | Adam et al. | 310/239 |
| 4,409,508 | A * | 10/1983 | Ooki et al. | 310/239 |
| 4,596,941 | A | 6/1986 | Kluck | |
| 4,652,706 | A * | 3/1987 | Rao et al. | 200/409 |
| 4,774,754 | A * | 10/1988 | Stewart, Sr. | 29/596 |
| 4,866,322 | A * | 9/1989 | Baumeister et al. | 310/239 |
| 5,004,943 | A * | 4/1991 | Gagneux | 310/239 |
| 5,172,465 | A * | 12/1992 | Stewart, Sr. | 29/597 |
| 5,495,134 | A * | 2/1996 | Rosenblum | 310/239 |
| 6,628,036 | B1 * | 9/2003 | Lynch et al. | 310/242 |
| 2002/0175573 | A1 * | 11/2002 | Hayashi | 310/54 |

FOREIGN PATENT DOCUMENTS

| | | |
|---|---|---|
| DE | 88 12 549 U | 12/1988 |
| GB | 2 256 536 A | 12/1992 |
| JP | 10-136615 | 5/1998 |

* cited by examiner

*Primary Examiner*—Tran Nguyen
(74) *Attorney, Agent, or Firm*—Ronald E. Greigg

(57) ABSTRACT

An electrical machine including a brush holder disposed in a housing with the housing and/or housing cap having an elastic region which enables positioning of the brush holder relative to a commutator from outside the housing. An installation method for installing a brush holder of an electrical machine is also disclosed.

14 Claims, 2 Drawing Sheets

ELECTRICAL MACHINE COMPRISING BRUSH HOLDER THAT CAN BE SIMPLY POSITIONED AND MOUNTING METHOD FOR ELECTRIC MACHINE

CROSS-REFERENCE TO RELATED APPLICATIONS

This application is a 35 USC 371 application of PCT/DE2004/001127 filed on Jun. 2, 2004.

BACKGROUND OF THE INVENTION

1. Field of the Invention

The present invention relates to an electrical machine with a brush holder, which makes simple and secure positioning of the brush holder possible. The present invention also relates to a method for installing a brush holder of an electrical machine.

2. Description of the Prior Art

Electrical machines are well known in the prior art. In particular, electrical machines that include a brush holder which holds brushes that are in contact with a commutator disposed on the rotor shaft are known. If high efficiency of the electrical machine is to be achieved, the brushes must be aligned in a correct position relative to the commutator. Because of production variations, or tolerances, in the individual parts of the electrical machine, it is necessary for the brush holder in particular to be aligned relative to the commutator after installation, in order for the brushes to be positioned correctly. The alignment of the brush holder is done via openings which are provided in the housing or in the housing cap of the electrical machine and which are closed again by means of a small additional cap after the brush holder has been aligned. Often, however, the fields in which the electrical machines are used require them to be watertight. For this reason, the openings present for the alignment of the brush holder must be closed tightly after the alignment. This presents an additional risk of a leak. Watertight electrical machines of this kind are used for instance as drives for windshield wipers in vehicles.

SUMMARY AND ADVANTAGES OF THE INVENTION

The electrical machine of the invention has the advantage over the prior art that no additional opening has to be provided in the housing or in the housing cap of the electrical machine for aligning the brush holder. This is achieved according to the invention by providing that in the housing and/or in the housing cap of the electrical machine, an elastic region is provided by way of which positioning of the brush holder is possible from the outside of the electrical machine. As a result, according to the invention, a seal required for an additional cap for closing the alignment opening in the prior art can be dispensed with.

The elastic region for aligning the brush holder is preferably disposed in the housing cap of the electrical machine.

Especially preferably, the elastic region is formed by an elastomer element secured in the housing or the housing cap. The elastomer element can be secured, for instance by means of welding or some other method, in the housing or in the housing cap before installation. In the uninstalled state of the electrical machine, the securing of the elastomer element can be done without major effort. As a result, adequate sealing is attained even though the housing or housing cap has the elastomer element as an additional element.

The elastomer element is furthermore preferably an elastomer diaphragm.

In another preferred feature of the present invention, the elastic region is embodied integrally with the housing and/or the housing cap. This alternative has the great advantage that no additional element is provided in the housing or the housing cap, so that one sealing point can be dispensed with. This also has advantages in terms of production and assembly. Especially preferably, the integrally formed elastic region is formed by a wavelike structure in the housing or in the housing cap. An annular wavelike structure is especially preferred. Alignment of the brush holder installed in the housing can then be done especially simply by way of the region enclosed by the wavelike structure.

Especially preferably, the electrical machine is designed to be watertight. This can be accomplished for instance by providing a seal between the housing and the housing cap.

The electrical machine of the invention is preferably used in a vehicle, in particular as a drive for electrically actuated accessories, such as windshield wipers or the like.

In the installation method for installing a brush holder in an electrical machine, the brush holder is first introduced into a housing component, and the further components of the electrical machine are installed in the housing. Next, the housing component is closed by means of a housing cap, and then the brush holder is positioned in its final place via an elastic region embodied in the housing or in the housing cap. Thus the elastic region of the invention on the housing or the housing cap makes final positioning of the brush holder possible from outside the electrical machine. As a result, closure of the openings otherwise provided in the housing for positioning the brush holder can be dispensed with. Moreover, for instance after a certain number of hours of operation, simple positioning of the brush holder can be done from outside as needed, in the event that the brush holder has changed position as a consequence of operation.

Especially preferably, the final positioning of the brush holder is done by means of a die element positioned from outside against the housing or against the housing cap.

BRIEF DESCRIPTION OF THE DRAWINGS

A plurality of exemplary embodiments of the present invention are described below in detail, in conjunction with the drawings, in which.

DESCRIPTION OF THE PREFERRED EMBODIMENTS

An electrical machine 1 in a first exemplary embodiment of the present invention will now be described, in conjunction with FIGS. 1 and 2.

Figure 1:
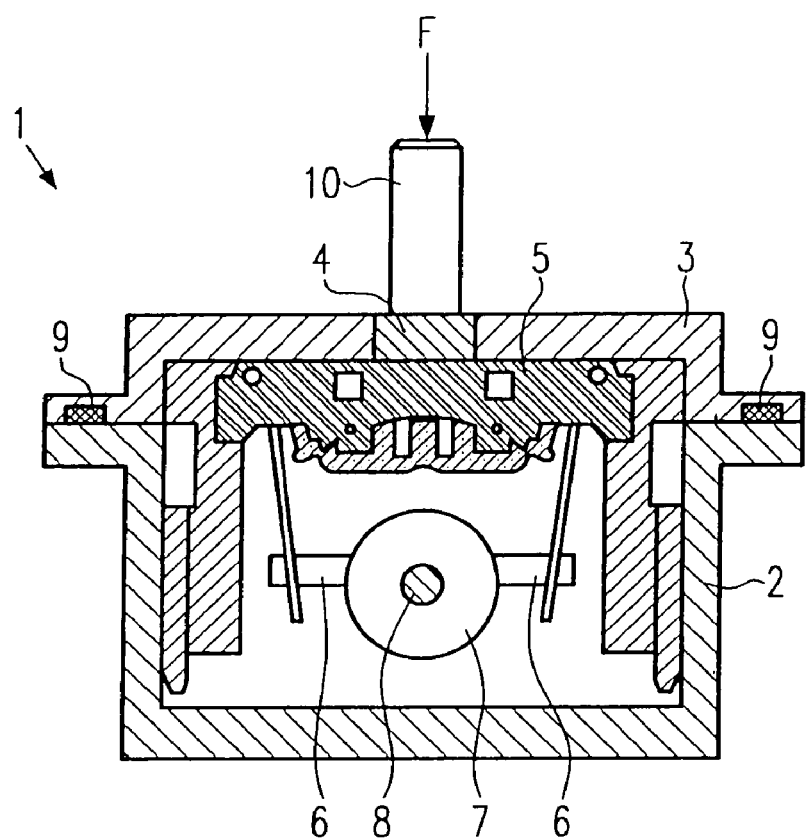
FIG. 1 is a schematic sectional view of an electrical machine in a first exemplary embodiment of the present invention.

As shown in FIG. 1, the electrical machine 1 includes a housing including a body 2 and a housing cap 3, and a brush holder 5. The brush holder 5 is disposed in the interior of the housing and serves to hold brushes 6 that rest on a commutator 7. The commutator 7 is disposed on a rotor shaft 8 in a known manner. An elastomer element 4 is also disposed in the housing cap 3.

Figure 2:
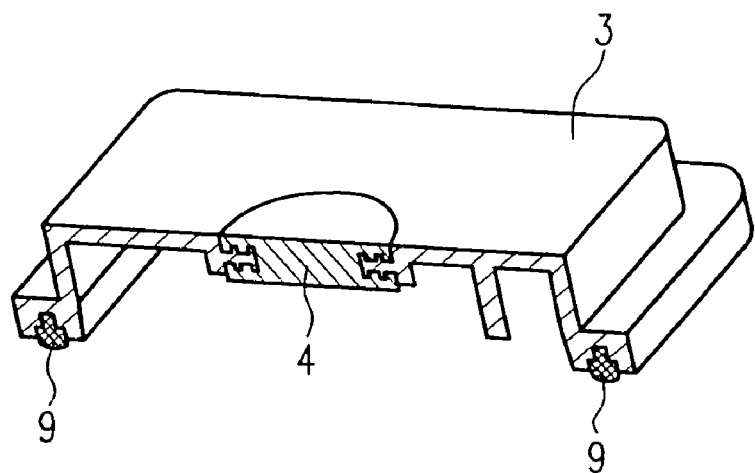
FIG. 2, a schematic perspective sectional view of the housing cap used in FIG. 1.

As FIG. 2 shows, the elastomer element 4 is disposed in the middle of the housing cap 3 and is essentially cylindrical in shape. To achieve secure sealing off from the housing cap 3, a fastening slot is provided in the outer circumference of the cylinder, so that as FIG. 2 shows in detail, a double sealing is achieved between the elastomer element 4 and the housing cap 3. For safety's sake, the elastomer element 4 can also be welded to the housing cap 3. A seal 9 is also embodied between the housing cap 3 and the housing. The electrical machine 1 of the first exemplary embodiment is used as a wiper motor in vehicles and must therefore be watertight.

As indicated in FIG. 1, once the electrical machine has been fully assembled, an alignment of the brush holder 5 relative to the commutator 7 is performed. To that end, a die element 10 is guided from outside the electrical machine 1 against the elastomer element 4, as shown in FIG. 1. The die element 10 exerts a predetermined force F on the elastomer element 4 to enable final positioning of the brush holder 5 relative to the commutator 7. As a result, production-dictated variations can be compensated for without providing an opening in the housing or the housing cap that has to be closed again after the positioning is done. The brush holder 5 is disposed in the housing in such a way that to a certain extent it can vary its position relative to the commutator 7. This can be attained for instance by way of a slight press fit between the brush holder 5 and the housing 2.

The electrical machine 1 of the invention can thus also meet the requirement, necessary for its use as a wiper motor in vehicles, in terms of watertightness without having to accept sacrifices in terms of quality that can occur because of different tolerances of the various individual components. Final positioning of the brush holder 5 can be performed markedly more simply than in the prior art.

Figure 3:
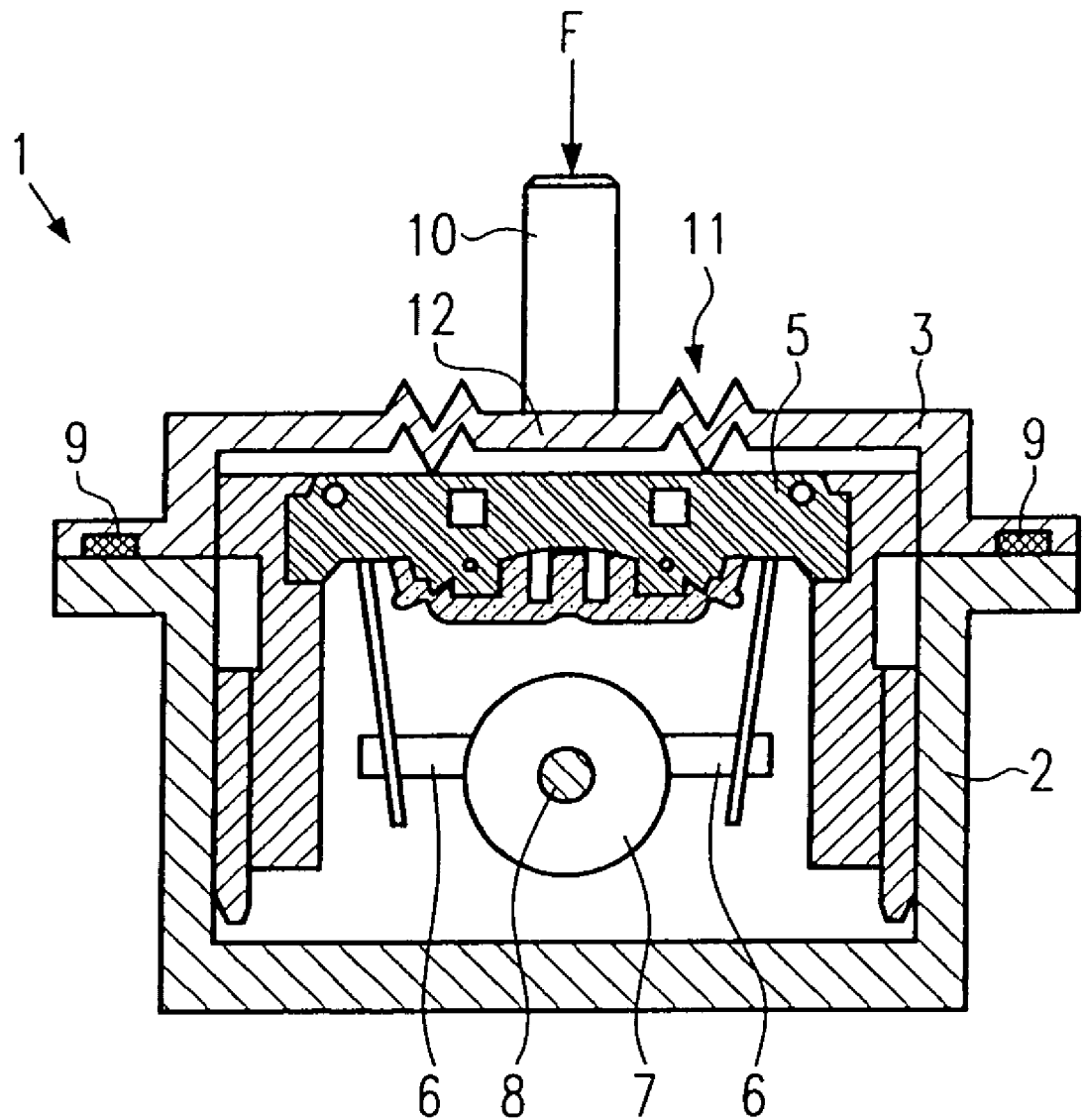
FIG. 3, a schematic sectional view of an electrical machine in a second exemplary embodiment of the present invention.

A second exemplary embodiment of the present invention will now be described, in conjunction with FIG. 3. Parts that are the same or functionally the same are identified by the same reference numerals as in the first exemplary embodiment.

The second exemplary embodiment is substantially equivalent to the first exemplary embodiment, and therefore only differences between them will be described in detail below. As can be seen from FIG. 3, instead of the elastomer element, the housing cap 3 has an elastic region 11 that is formed integrally with the housing cap 3. The elastic region 11 has a wavelike structure and is formed annularly. As a result as shown schematically in FIG. 3, a die element 10 can be positioned against the portion 12 surrounded by the elastic region 11 and can deform the housing cap 3 with a predetermined force F. In the process, the interior of the housing cap 3 comes into contact with the brush holder 5, so that when the housing cap 3 has been installed, positioning of the brush holder 5 is possible relative to the housing body 2 and to the commutator 7. This exemplary embodiment ha the particular advantage that the elastic region 11 is formed integrally with the housing cap 3. As a result, there are no sealing problems whatever. Moreover, the elastic region 11 can be produced jointly with the production of the housing cap 3 in a simple way. Especially preferably, the housing cap 3 is made from a plastic material or a spring steel. Once the brush holder 5 has been aligned in its final position, the housing cap 3, after the die forced F is withdrawn, resumes its original shape. If during operation of the electrical machine realignment of the brush holder 5 relative to the commutator 7 should become necessary, this can be done in a simple way by positioning the die element 10 against the portion 12 surrounded by the plastic region.

The electrical machine of the invention is used preferably in vehicles, in which the electrical machine may have watertight properties. For instance, the electrical machine is used as a wiper motor for windshield wipers or as a drive for other electrically actuated accessories.

The foregoing relates to preferred exemplary embodiments of the invention, it being understood that other variants and embodiments thereof are possible within the spirit and scope of the invention, the latter being defined by the appended claims.

The invention claimed is:

1. An electrical machine, comprising a housing for the machine, the housing including a housing body (2) and a housing cap (3), a brush holder (5) disposed in the housing for holding brushes (6), and an elastic region (4; 11) in the housing cap (3) which enables positioning of the brush holder (5) relative to a commutator (7) from outside the housing, wherein the elastic region (4) is embodied as an independently formed elastomer element disposed in and secured in the housing cap (3), and wherein a seal is achieved between the elastomer element and the housing cap (3), wherein the elastomer element secured in the housing cap (3) is shaped as a cylinder and which is provided with a fastening slot in an outer circumference of the cylinder thereby achieving the seal between the elastomer element and the housing cap.

2. An electrical machine, comprising a housing for the machine, the housing including a housing body (2) and a housing cap (3), a brush holder (5) disposed in the housing for holding brushes (6), and an elastic region (4; 11) in the housing cap (3) which enables positioning of the brush holder (5) relative to a commutator (7) from outside the housing, wherein the elastic region (4) is embodied as an independently formed elastomer element disposed in and secured in the housing cap (3), and wherein a seal is achieved between the elastomer element and the housing cap (3), wherein a fastening slot is provided in the outer circumference of the cylinder, so that a double seal is achieved between the elastomer element 4 and the housing cap 3.

3. An electrical machine, comprising a housing for the machine, the housing including a housing body (2) and a housing cap (3), a brush holder (5) disposed in the housing for holding brushes (6), and an elastic region (4; 11) in the housing cap (3) which enables positioning of the brush holder (5) relative to a commutator (7) from outside the housing, wherein the elastic region (4) is embodied as an independently formed elastomer element positioned within and secured to the housing cap (3), and wherein a seal is achieved between the elastomer element and the housing cap (3), and wherein the housing cap (3) is rigid relative to the independently formed elastomer element.

4. The electrical machine according to 3, wherein the elastomer element secured in the housing cap (3) is shaped as a cylinder.

5. The electrical machine according to claim 3, wherein the elastomer element is an elastomer diaphragm.

6. The electrical machine according to claim 3, wherein the electrical machine is embodied as watertight.

7. The electrical machine according to claim 3, wherein the electrical machine is used in a vehicle as a drive for electrically actuated accessories.

8. The electrical machine according to claim 3, wherein the electrical machine is used in a vehicle as a drive for windshield wipers.

9. The electrical machine according to claim 3, wherein the brush holder (5) is disposed in the housing body (2) by a slight press fit.

10. The electrical machine according to claim 3, wherein a seal (9) is embodied between the housing cap (3) and the housing body (2).

11. The electrical machine according to claim 3, wherein the elastomer element (4) is welded to the housing cap (3).

12. The electrical machine according to claim 3, wherein the brush holder (5) is disposed in the housing body in a manner such that the positioning of the brush holder (5) relative to the commutator (7) is variable.

13. The electrical machine according to claim 3, wherein a press fit exists between the brush holder (5) and the housing (2).

14. The electrical machine according to claim 3, wherein a die element (10) guided from outside the housing cap (3) and pressed against the elastomer element (4) with a predetermined force F, enables a final positioning of the brush holder (5) relative to the commutator (7).

* * * * *